United States Patent [19]

Shinada et al.

[11] Patent Number: 5,631,674
[45] Date of Patent: May 20, 1997

[54] RECORDING APPARATUS

[75] Inventors: Yasuyuki Shinada, Yokohama; Seishi Ejiri, Kawasaki, both of Japan

[73] Assignee: Canon Kabushiki Kaisha, Tokyo, Japan

[21] Appl. No.: 185,224

[22] Filed: Jan. 24, 1994

Related U.S. Application Data

[63] Continuation of Ser. No. 864,686, Apr. 7, 1992, abandoned, which is a continuation of Ser. No. 617,642, Nov. 26, 1990, Pat. No. 5,132,711.

[30] Foreign Application Priority Data

Feb. 23, 1990 [JP] Japan .................................. 2-41061

[51] Int. Cl.$^6$ .................................................. B41J 2/175
[52] U.S. Cl. .................................................. 347/37; 358/406
[58] Field of Search ........................ 346/140 R; 358/404, 358/449, 296, 406, 444, 434, 468, 504, 524; 400/249, 703, 706, 712; 347/7, 3, 5

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,491,853 | 1/1985 | Hayashi et al. ................. 346/76 PH |
| 4,558,333 | 12/1985 | Sugitani et al. . |
| 4,704,636 | 11/1987 | Yano ................................ 358/280 |
| 4,723,129 | 2/1988 | Endo et al. . |
| 4,740,796 | 4/1988 | Endo et al. . |
| 4,796,091 | 1/1989 | Nohtomi ........................... 358/256 |
| 4,970,599 | 11/1990 | Nobuta ............................. 358/296 |
| 5,132,711 | 7/1992 | Shinada et al. ................... 347/6 |

FOREIGN PATENT DOCUMENTS

| | | | |
|---|---|---|---|
| 0287098 | 10/1988 | European Pat. Off. | B41J 3/04 |
| 59-123670 | 7/1984 | Japan | B41J 3/04 |
| 59-138461 | 8/1984 | Japan | B41J 3/04 |
| 61-029269 | 2/1986 | Japan | H04N 1/32 |
| 63-053632 | 3/1988 | Japan | G06F 3/12 |
| 63-056472 | 3/1988 | Japan | B41J 5/30 |
| 63-130371 | 6/1988 | Japan | B41J 15/00 |
| 01195049 | 8/1989 | Japan | B41J 3/04 |
| 1-290431 | 11/1989 | Japan | B41J 3/04 |
| 90000974 | 2/1990 | WIPO | B41J 3/04 |

*Primary Examiner*—Joseph W. Hartary
*Attorney, Agent, or Firm*—Fitzpatrick, Cella, Harper & Scinto

[57] ABSTRACT

A recording apparatus includes a recording unit for ejecting an ink to a recording member, a detection unit for detecting a remaining amount of ink, a memory for storing received data, and a control unit for controlling an operation of the recording unit to record an image in accordance with the received data, and controlling the memory to store image data in the memory. The control unit controls the memory in accordance with an output from the detection unit upon completion of recording of a predetermined volume of data, clears data stored in the memory when the output from the detection unit indicates a presence of ink, and preserves data stored in the memory when the output from the detection unit indicates an absence of ink.

36 Claims, 4 Drawing Sheets

RECORDING APPARATUS

This application is a continuation of application Ser. No. 07/864,686 filed Apr. 7, 1992, now abandoned, which in turn is a continuation of application Ser. No. 07/617,642 filed Nov. 26, 1990, now U.S. Pat. No. 5,132,711 issued Jul. 21, 1992.

BACKGROUND OF THE INVENTION

1. Field of the Invention

The present invention relates to a recording apparatus and, more particularly, to a recording apparatus for recording an image by ejecting an ink from a recording head having a plurality of ejection ports.

2. Related Background Art

In recent years, so-called bubble-jet type ink jet printers for ejecting an ink from ejection ports toward a recording member by utilizing bubbles generated by heat energy to record characters, images, and the like have been developed. This printer has heat generation resistors (heaters) which are arranged in the respective ejection ports and are considerably smaller than piezoelectric elements used in a conventional ink jet printer, and multiple ejection ports can be arranged at a high density. Therefore, a high-quality image can be obtained, and high-speed and low-noise features can also be provided.

On the other hand, a facsimile apparatus is required not only to transmit an image at high speed but also to receive a higher-quality image at high speed. The above-mentioned bubble-jet type ink jet printer is considered as one of such printers which can satisfy the requirements in terms of its features.

When the ink jet printer is used as a printer for a facsimile apparatus, if an ink is used up during a data recording operation, even if a memory intercepting operation is started after the end of the page, data between a position where the ink is used up to the end of the page cannot be recorded, and is omitted.

SUMMARY OF THE INVENTION

The present invention has been made in consideration of the above situation, and has as its object to provide an improved ink jet type recording apparatus.

It is another object of the present invention to provide a recording apparatus which can record receiving data without omissions.

It is still another object of the present invention to provide a recording apparatus which can prevent data from being omitted without using a large-capacity memory even when an ink is used up during receipt.

It is still another object of the present invention to provide a recording apparatus which records an image in accordance with receiving data, stores the receiving data in a memory, detects a remaining amount of an ink every time data for the predetermined number of pages are recorded, clears the data in the memory when the ink is detected, and preserves the data in the memory when no ink remains.

The above and other objects will be apparent from the following description taken in conjunction with the accompanying drawings.

DETAILED DESCRIPTION OF THE PREFERRED EMBODIMENTS

An embodiment of the present invention will be described in detail below with reference to the accompanying drawings.

Figure 1:
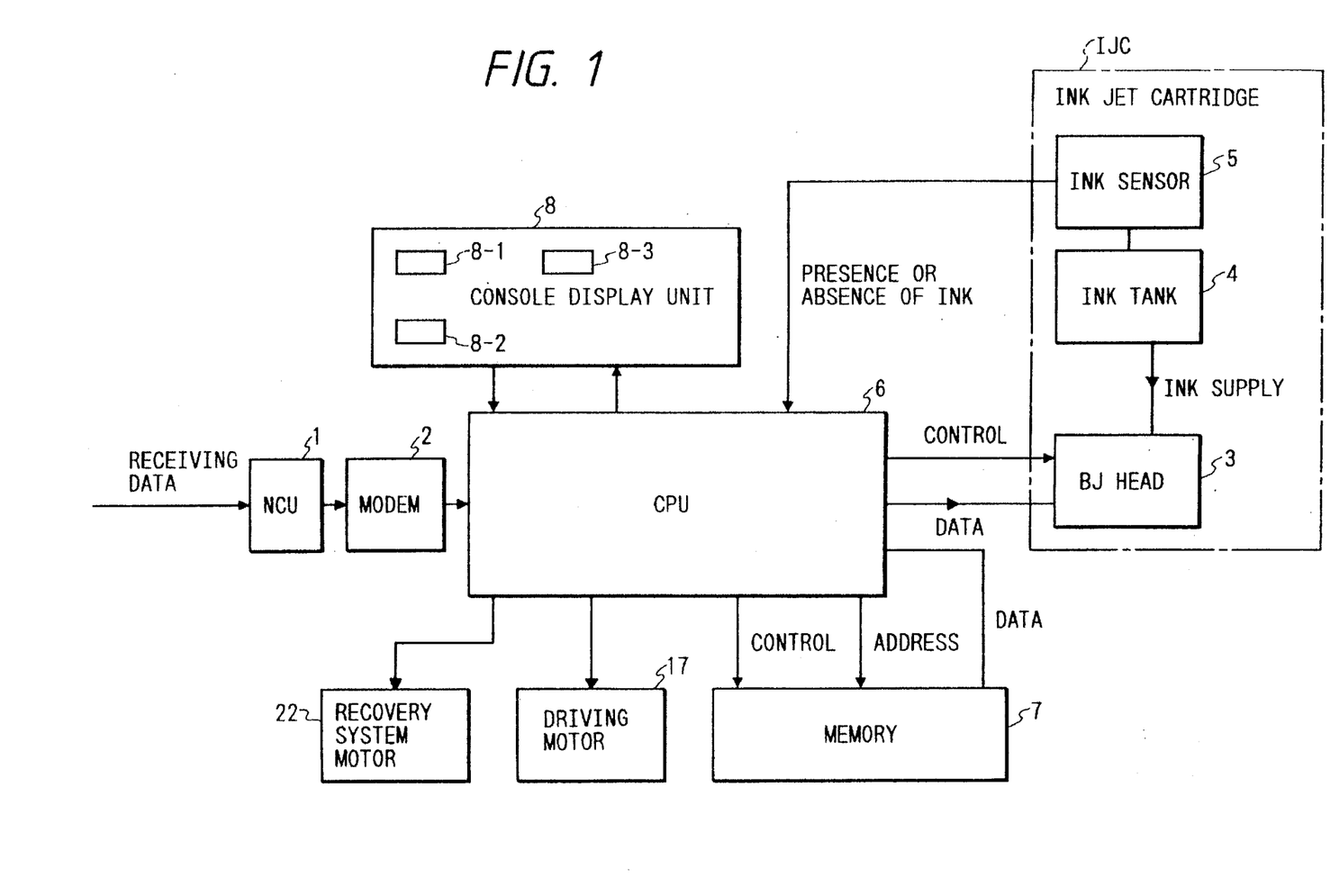
FIG. 1 is a block diagram showing an arrangement according to an embodiment of the present invention.
Figure 2:
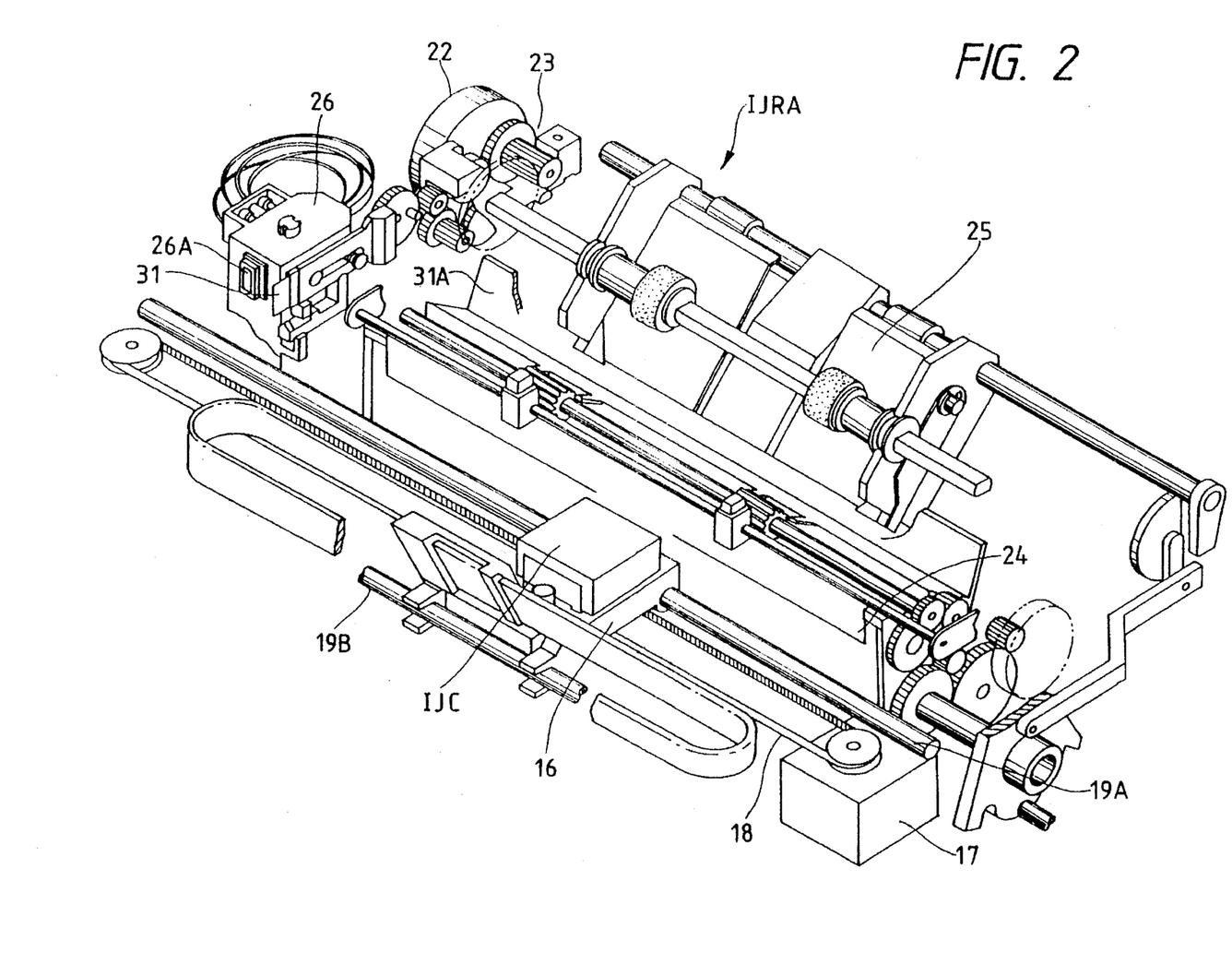
FIG. 2 is a perspective view showing an arrangement according to the embodiment of the present invention.
Figure 3:
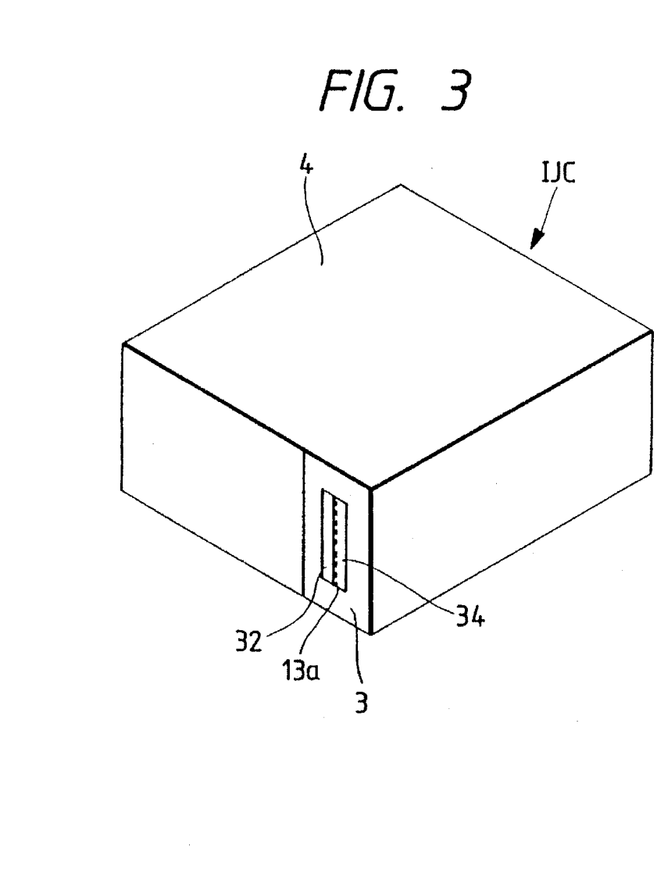
FIG. 3 is a perspective view showing an ink jet cartridge shown in FIG. 2.

FIGS. 1 and 2 show an embodiment of the present invention.

In FIG. 2, an ink jet cartridge IJC is of a disposable type, which is detachable from a carriage 16 of an ink jet recording apparatus IJRA by a predetermined method. At least one ink jet cartridge IJC can be arranged in accordance with an ink to be used, and comprises a bubble-jet type recording head (to be referred to as a BJ head hereinafter) 3, an ink tank 4, and an ink sensor 5.

Figure 4A:
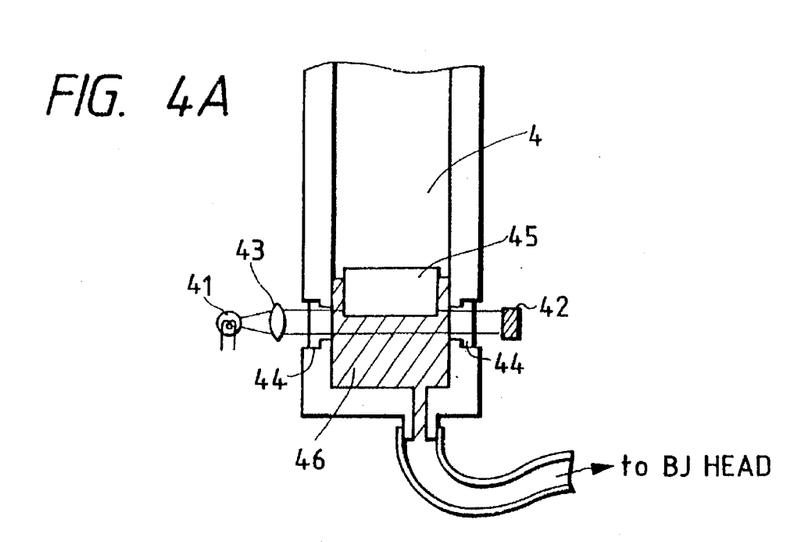
FIGS. 4A and 4B are schematic views showing an ink sensor.
Figure 4B:
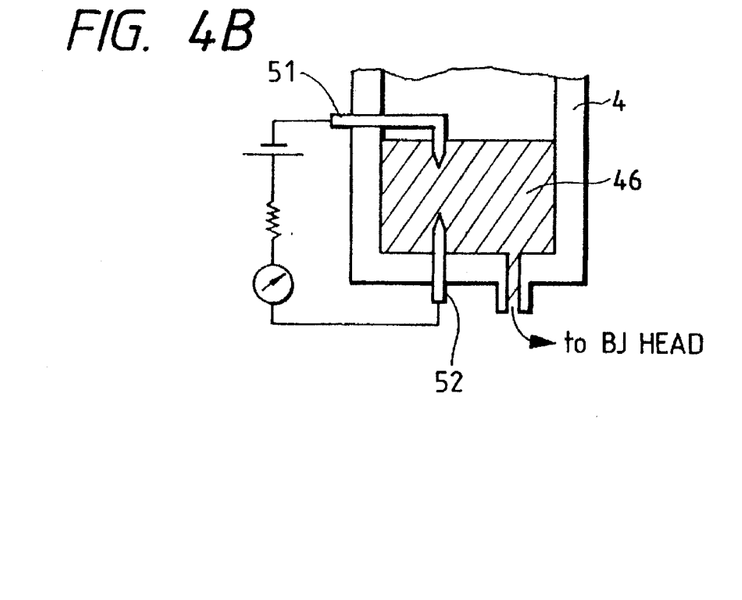

The BJ head 3 receives an ejection signal according to recording data from a data supply source through a cable and a terminal coupled thereto. The distal end portion of the BJ head 3 slightly projects from the front surface of the ink tank 4, as shown in FIG. 4. A top plate 34 having a partition wall for defining an ink path is adhered to a heater board 32. The top plate 34 is formed of a resin such as polysulfone, polyethersulfone, polyphenylene oxide, polypropylene, or the like, having a good ink resistance. The ink tank 4 stores an ink to be supplied to the BJ head 3, and comprises an ink absorbing member, a casing for receiving the ink absorbing member, and a lid member for sealing the casing (none of them are shown). An ink stored in the ink tank 4 is sequentially supplied to the BJ head 3 according to ink ejection from ejection ports.

The carriage 16 is coupled to a portion of a driving belt 18 for transmitting a driving force of a driving motor 17, and is slidably guided along two parallel guide shafts 19A and 19B, so that the BJ head 3 can be reciprocally moved within the total width of a recording member. A relative movement between the carriage 16 and the recording member is controlled in accordance with a predetermined input recording signal, thereby forming a desired image on a recording surface of the recording member (recording sheet) which is fed from a paper feed unit 25 onto a platen 24.

A head recovery device 26 is arranged at one end of a moving path of the BJ head 3, e.g., at a position opposing a home position. The head recovery device 26 is operated by a driving force of a motor 22 via a transmission mechanism 23, thereby capping the BJ head 3. Ink suction by a proper suction means arranged in the head recovery device 26 or ink supply under pressure by a proper pressurizing means arranged in the ink path to the BJ head 3 is performed in association with capping to the BJ head 3 by a cap portion 26A of the head recovery device 26, so that an ink is forcibly exhausted from the ejection ports, thereby performing injection recovery processing for, e.g., removing an ink having an increased viscosity and present in the ink path. The BJ head 3 is capped upon completion of recording, thereby protecting the BJ head 3.

A blade 31 formed of silicone rubber is arranged on a side surface of the head recovery device 26, and serves as a wiping member. The blade 31 is held on a blade holding member 31A in a cantilever manner, and is operated by the motor 22 and the transmission mechanism 23 as in the head recovery device 26 so as to be able to engage with the ejection surface of the BJ head 3. Thus, the blade 31 projects into the moving path of the BJ head 3 at a proper timing in the recording operation of the BJ head 3 or after an ejection recovery operation using the head recovery device 26, and wipes a dew, a wet portion, dust, and the like on the ejection surface of the BJ head 3 upon movement of the BJ head 3.

In FIG. 1, IJC, 3, 4, 17, and 22 designate the same parts as those in FIG. 2. An NCU (network control unit) 1 transmits/receives data to/from a communication network. A modem 2 demodulates an analog signal sent from the NCU 1 into a digital signal, and modulates a digital signal into an analog signal and sends the analog signal to the NCU 1. An ink sensor 5 as an ink detection means detects the presence/absence of an ink in the ink tank 4. FIGS. 4A and 4B show an example of the ink sensor. The ink sensor will be described in detail later. A main controller (CPU) 6 of this facsimile apparatus mainly comprises a known one-chip microcomputer, and controls facsimile operations such as communications, recording operations, and the like. A memory 7 stores data demodulated by the modem 2. A console display unit 8 comprises various key switches for setting transmission/receipt operations, and various displays comprising LCDs and LEDs.

In this embodiment, the CPU 6 drives the BJ head 3 in accordance with receiving data to record an image on a recording sheet. The CPU 6 stores the receiving data in the memory 7 in addition to the recording operation. Upon completion of data recording for one page, the CPU 6 checks the output from the ink sensor 5. If it is detected that the ink is present, the CPU 6 determines that all the receiving data are recorded, and clears the memory 7. However, if it is detected that the ink is absent, since the receiving data may not be recorded, the CPU 6 preserves data stored in the memory 7. The CPU 6 turns on an indicator 8-1 on the console display unit 8, thus performing an alarm display. When a predetermined key input of a key 8-2 on the console display unit 8 is detected after the ink is replenished, the CPU 6 reads out data from the memory 7, and restarts recording.

Ink remaining amount detection will be described below with reference to FIGS. 4A and 4B.

FIG. 4A shows an embodiment for optically detecting a remaining amount of ink. This embodiment utilizes the fact that an ink allows infrared rays to pass therethrough. In FIG. 4A, infrared rays emitted from a light-emitting element 41 through a lens 43 and transparent windows 44 formed in the ink tank 4 are detected by a light-receiving element 42 which opposes the light-emitting element 41 to sandwich the ink tank 4 therebetween. The light-receiving element 42 outputs a voltage corresponding to a light-receiving amount. A float 45 is arranged in the ink tank 4. An ink amount in the ink tank 4 is decreased as an ink consumption increases. The float 45 sinks with a decrease in ink amount, and then shields an optical path extending from the light-emitting element 41 to the light-receiving element 42 when an ink amount reaches a predetermined amount. An output from the light-receiving element 42 at this time serves as an ink absence signal. In this manner, the presence/absence of an ink can be discriminated based on the output from the light-receiving element 42.

FIG. 4B shows an embodiment for detecting a remaining amount of ink by utilizing a conductivity of an ink. In this embodiment, electrodes 51 and 52 are arranged in the ink tank 4 to be separated from each other by a predetermined distance, and a predetermined voltage is applied across the electrodes. When a predetermined amount of ink or more remains, the electrodes are electrically connected to each other. However, when the remaining amount of ink becomes smaller than a predetermined amount, the electrodes are electrically disconnected from each other. Thus, an ink absence signal is output. In this manner, the presence/absence of an ink can be discriminated based on a current between the electrodes 51 and 52.

Figure 5:
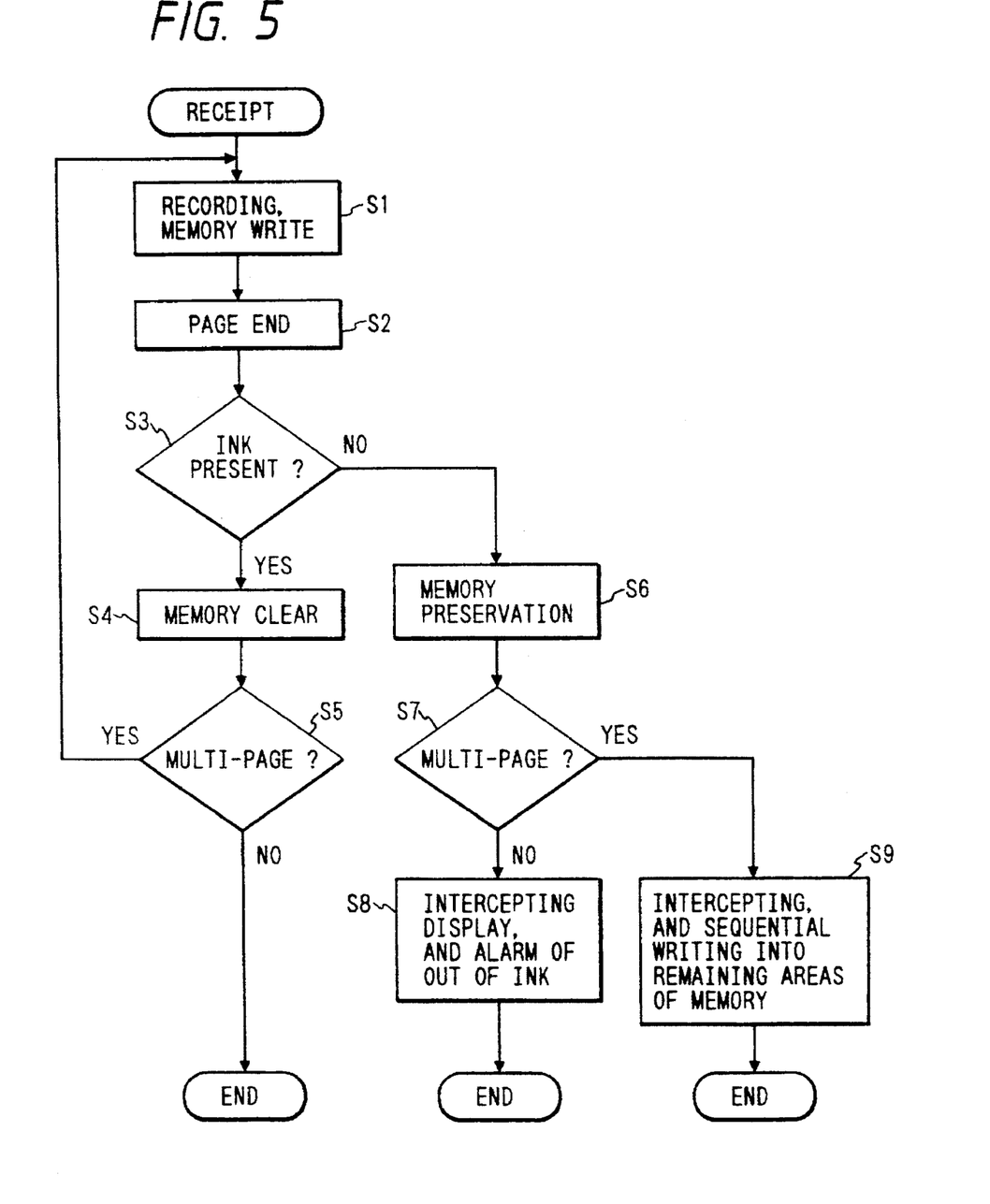
FIG. 5 is a flow chart showing a recording control sequence executed by a CPU 6.

FIG. 5 is a flow chart showing a recording control sequence executed by the CPU.

After call incoming, the CPU 6 sends a DIS (digital identification signal) to a calling party, and drives the recovery system motor 22 to perform a recovery operation of the BJ head 3. After the CPU performs a preparation for receipt, it sends a CFR (confirmation signal for receipt preparation) to the calling party, and starts a receipt operation. FIG. 5 shows an operation after the receipt operation is started.

In step S1, the CPU writes receipt data input through the NCU 1 and the modem 2 in the memory 7, and at the same time, performs recording using the BJ head 3 on the basis of the receipt data. After recording for one page is ended in step S2, it is checked in step S3 if an ink remains in the ink tank 4. If YES in step S3, the CPU determines that the corresponding page can be recorded, and the flow advances to step S4. In step S4, the CPU clears the memory. More specifically, the CPU returns an address to the start address, writes receipt data again, and checks in step S5 if a multi-page document is to be recorded. If NO in step S5, the CPU ends the processing; otherwise, the flow returns to step S1, and the CPU repeats steps S1 to S5 up to the last page.

On the other hand, if it is determined in step S3 that an ink is absent, the CPU determines that the corresponding page may not be recorded, and preserves recording data already stored in the memory 7 without clearing it. The CPU checks in step S7 if a multi-page document is to be recorded. If NO in step S7, the flow advances to step S8. In step S8, the CPU turns on the indicator 8-1 to indicate an intercepting mode, and alarms an out-of-ink state.

On the other hand, if it is determined in step S7 that a multi-page document is to be recorded, the flow advances to step S9. In step S9, the CPU executes an intercepting operation, and sequentially writes data in the remaining areas of the memory. In the same manner as in step S8, the CPU turns on the indicator 8-1 to indicate the intercepting mode, and alarms an out-of-ink state.

After an ink is replenished or the ink jet cartridge IJC is replaced, the CPU reads out data from the memory 7 upon operation of the specific key 8-2 on the console display unit 8, and can record the data on a recording sheet.

Note that in the above embodiment, the presence/absence of an ink is detected every time recording for one page is completed. However, the present invention is not limited to this. For example, the presence/absence of an ink may be detected every time recording for a plurality of pages is completed. Alternatively, the presence/absence of an ink may be detected every time recording for one communication cycle is completed, and data in the memory may be cleared or preserved.

Furthermore, the presence/absence of an ink may be detected every time recording for one or a plurality of lines is completed, and data in the memory may be cleared or preserved.

In the above embodiment, an apparatus employing a bubble-jet type recording head of ink jet recording methods has been described. As for a typical arrangement and principle of the bubble-jet recording head, the basic principle disclosed in U.S. Pat. Nos. 4,723,129, and 4,740,796 is preferably used. The method disclosed in these references can be applied to either a so-called on-demand type or continuous type system. In particular, the on-demand type system is effective for the following reason. That is, at least one drive signal for giving an abrupt temperature rise exceeding a film boiling temperature in correspondence with recording information is applied to electro-thermal conversion elements arranged in correspondence with a sheet or path for holding a liquid (ink), so that the electro-thermal conversion element generates a heat energy to cause film boiling on a heat application surface of a recording head, and a bubble can be consequently formed in the liquid (ink) having a one-to-one correspondence with this drive signal. Upon growth and shrinkage of this bubble, the liquid (ink) is ejected through the ejection port, thereby forming at least one ink droplet. It is more preferable to form the drive signal in a pulse form since bubbles can be quickly and appropriately grown and shrunken, thus attaining liquid (ink) injection having good response characteristics. As a pulsed drive signal, signals disclosed in U.S. Pat. Nos. 4,463,359 and 4,345,262 are preferable. When conditions associated with a rate of an increase in temperature of the heat application surface, described in U.S. Pat. No. 4,313,124, are adopted, better recording can be assured.

As for an arrangement of a recording head, the present invention includes an arrangement using that disclosed in U.S. Pat. Nos. 4,558,333 and 4,459,600 which disclose an arrangement wherein a heat application portion is arranged in a bent region as well as an arrangement as a combination of an ejection port, a liquid path, and an electro-thermal conversion element (linear liquid path or a right-angle liquid path) disclosed in the above-mentioned references. In addition, the effect of the present invention can be obtained if an arrangement based on Japanese Laid-Open Patent Application No. 59-123670 which discloses an arrangement wherein a slit common to a plurality of electro-thermal conversion elements is used as an ejection portion of the electro-thermal conversion elements, and an arrangement based on Japanese Laid-Open Patent Application No. 59-138461 which discloses an arrangement wherein an opening for absorbing a pressure wave of a heat energy is formed in correspondence with an ejection portion is adopted. More specifically, recording can be reliably and efficiently performed regardless of the type of recording head.

Moreover, the present invention can be effectively applied to a full-line type recording head which has a length corresponding to a maximum width of a recording medium which can be used in a recording apparatus. A recording head of this type may adopt either an arrangement for satisfying the length as a combination of a plurality of recording heads, or an arrangement using an integrally formed single recording head. In addition, the present invention is also effective when an exchangeable chip-type recording head which can be electrically connected to an apparatus main body and can receive an ink from the apparatus main body when it is attached to the apparatus main body like in the above-mentioned serial type head is employed.

It is preferable to add a recovery means, an auxiliary assist means, and the like to a recording head since the effect of the present invention can be further stably obtained. More specifically, these means include a capping means, cleaning means, and compression or suction means for the recording head, an auxiliary heating means such as an electro-thermal conversion element, or another heating element, or a combination thereof, and a means for performing an auxiliary ejection mode in addition to an ejection operation for recording. If these means are employed, recording can be more stably performed.

As for the type and number of recording heads to be mounted, for example, only one head may be arranged in correspondence with a monochrome ink, or a plurality of heads may be arranged in correspondence with a plurality of inks having different recording colors and densities.

As described above, the presence/absence of an ink is detected upon completion of recording of a predetermined volume of data, and when it is determined that the ink is present, a memory is cleared. However, when it is determined that the ink is absent, the already stored recording data is preserved. Thus, data for a page corresponding to the out-of-ink timing can be prevented from being entirely omitted.

What is claimed is:

1. A recording apparatus for recording a received image on a recording material using recording means for ejecting ink in accordance with image data, the apparatus comprising:

detection means for detecting presence/absence of ink after completion of recording of a current page of data and before initiation of recording of a next page of data;

storage means for storing received data, said storage means being capable of storing at least a page of data;

control means for controlling said storage means such that storage of the received data in said storage means is performed in parallel with recording of the received data by said recording means, wherein said control means controls said storage means in accordance with an output from said detection means, and wherein when said detection means detects an absence of ink after completion of recording of a current page of data and before initiation of recording of the next page of data, said control means preserves the received data which has been stored in the storage means and preserves successive received data which is to be stored in said storage means;

informing means for indicating that said detection means has detected an absence of ink; and instruction means for instructing said control means to read out the image data stored in said storage means.

2. A recording apparatus according to claim 1, wherein said instruction means comprises input means for performing a predetermined key input and said control means controls said storage means such that the data is read out from said storage means in response to a key input from said input means to perform the image recording.

3. A recording apparatus according to claim 1 or 2, wherein said recording means includes a recording head provided with a plurality of ink orifices, each provided with a corresponding ejection energy generating element for generating energy for ejecting ink from the orifice, and an ink storing unit for storing the ink.

4. A recording apparatus according to claim 3, wherein said recording head and said ink storing unit are integrated.

5. A recording apparatus according to claim 4, wherein each ejection energy generating element generates thermal energy for ejecting an ink droplet from the corresponding ink orifice by causing a change in state of the ink.

6. A recording apparatus according to claim 3, wherein each ejection energy generating element generates thermal energy for ejecting an ink droplet from the corresponding ink orifice by causing a change in state of the ink.

7. An apparatus according to claim 1, further comprising receiving means for receiving data transmitted from a communication device, wherein said storage means stores data received by said receiving means.

8. An apparatus according to claim 7, wherein said recording means includes a recording head provided with a plurality of ink orifices, each provided with a corresponding ejection energy generating element for generating energy for ejecting ink from the orifice, and an ink storing unit for storing the ink.

9. A recording apparatus for recording a received image on a recording material using recording means for ejecting ink in accordance with image data, the apparatus comprising:
   detection means for detecting presence/absence of ink after completion of recording of a current page of data;
   storage means for storing received data, said storage means being capable of storing at least a page of data;
   control means for controlling said storage means such that storage of the received data in said storage means is performed in parallel with recording of the received data by said recording means, wherein said control means controls said storage means in accordance with an output from said detection means, and wherein when said detection means detects an absence of ink after completion of recording of a current page of data and before initiation of recording of the next page of data, said control means preserves the received current page of data which has been stored in the storage means;
   informing means for indicating that said detection means has detected an absence of ink; and
   instruction means for instructing said control means to read out the image data stored in said storage means.

10. A recording apparatus according to claim 9, wherein said instruction means comprises input means for performing a predetermined key input, and said control means controls said storage means such that the data is read out from said storage means in response to a key input from said input means to perform the image recording.

11. A recording apparatus according to claim 9 or 10, wherein said recording means includes a recording head provided with a plurality of ink orifices, each provided with a corresponding ejection energy generating element for generating energy for ejecting ink from the orifice, and an ink storing unit for storing the ink.

12. A recording apparatus according to claim 11, wherein said recording head and said ink storing unit are integrated.

13. A recording apparatus according to claim 12, wherein each ejection energy generating element generates thermal energy for ejecting an ink droplet from the corresponding ink orifice by causing a change in state of the ink.

14. A recording apparatus according to claim 11, wherein each ejection energy generating element generates thermal energy for ejecting an ink droplet from the corresponding ink orifice by causing a change in state of the ink.

15. A recording apparatus according to claim 9, further comprising receiving means for receiving data transmitted from a communication device, wherein said storage means stores data received by said receiving means.

16. A recording apparatus according to claim 15, wherein said recording means includes a recording head provided with a plurality of ink orifices, each provided with a corresponding ejection energy generating element for generating energy for ejecting ink from the orifice, and an ink storing unit for storing the ink.

17. An image communicating apparatus for outputting image data to a recording device for recording a received image on a recording material using recording means for ejecting ink in accordance with the image data, said recording device including detection means for detecting presence/absence of ink after completion of recording of a current page of data and before initiation of recording of a next page of data, the apparatus comprising:
   receiving means for receiving data transmitted from a communication device;
   storage means for storing received data, said storage means being capable of storing at least a page of data;
   control means for controlling said storage means such that storage of the received data in said storage means is performed in parallel with recording of the received data by said recording device, wherein said control means controls said storage means in accordance with an output from said detection means, and wherein when said detection means detects an absence of ink after completion of recording of a current page of data and before initiation of recording of the next page of data, said control means preserves the received data which has been stored in the storage means and preserves successive received data which is to be stored in said storage means;
   informing means for indicating that said detection means has detected an absence of ink; and
   instruction means for instructing said control means to read out the image data stored in said storage means.

18. An apparatus according to claim 17, wherein said instruction means comprises input means for performing a predetermined key input and said control means controls said storage means such that the data is read out from said storage means in response to a key input from said input means to perform the image recording.

19. An apparatus according to claim 17 or 18, wherein said recording device includes a recording head provided with a plurality of ink orifices, each provided with a corresponding ejection energy generating element for generating energy for ejecting ink from the orifice, and an ink storing unit for storing the ink.

20. An apparatus according to claim 19, wherein said recording head and said ink storing unit are integrated.

21. An apparatus according to claim 20, wherein each ejection energy generating element generates thermal energy for ejecting an ink droplet from the corresponding ink orifice by causing a change in state of the ink.

22. An apparatus according to claim 19, wherein each ejection energy generating element generates thermal energy for ejecting an ink droplet from the corresponding ink orifice by causing a change in state of the ink.

23. An image processing apparatus for supplying data corresponding to received image data to an ink jet recording device, said ink jet recording device including detection means for detecting presence/absence of ink, said image processing apparatus comprising:
   communication means for communicating image data;
   storage means for storing the image data received by said communication means;
   control means for controlling said storage means such that storage of the received data in said storage means is performed in parallel with recording of the received data by said ink jet recording device, wherein said control means controls said storage means in accordance with an output from said detection means, and wherein when said detection means detects an absence of ink after completion of recording of a predetermined volume of data and before initiation of recording of the next data, said control means preserves the received data stored in the storage means and preserves successive received data which is to be stored in said storage means;

informing means for informing that said detection means has detected an absence of ink; and instruction means for instructing said control means to read out the image data stored in said storage means.

24. An image processing apparatus according to claim 23, wherein said instruction means comprises input means for performing a predetermined key input and said control means controls said storage means such that the data is read out from said storage means in response to a key input from input means to perform the image recording.

25. An image processing apparatus according to claim 23, wherein said predetermined volume of data is one page of data.

26. An image processing apparatus according to claim 23, wherein said communication means communicates protocol signals and image data with a partner station via a communication line, wherein said storage means stores data received through said communication means.

27. An image processing apparatus according to claim 23, wherein said ink jet recording device includes a recording head provided with a plurality of ink orifices, each provided with a corresponding ejection energy generating element for generating energy for ejecting ink from the orifice, and an ink storing unit for storing the ink.

28. An image processing apparatus according to claim 27, wherein said recording head and said ink storing unit are integrated.

29. An image processing apparatus according to claim 28, wherein each ejection energy generating element generates thermal energy for ejecting an ink droplet from the corresponding ink orifice by causing a change in state of the ink.

30. An image processing apparatus for supplying data corresponding to received image data to an ink jet recording device, said ink jet recording device including detection means for detecting presence/absence of ink, said image processing apparatus comprising:

communication means for communicating image data;

storage means for storing the image data received by said communication means;

control means for controlling said storage means such that storage of the received data in said storage means is performed in parallel with recording of the received data by said ink jet recording device, wherein said control means controls said storage means in accordance with an output from said detection means, and wherein when said detection means detects an absence of ink after completion of recording of a predetermined volume of data, said control means preserves the received data stored in the storage means and preserves successive received data which is to be stored in said storage means, and when said detection means detects a presence of ink after completion of recording of a predetermined volume of data, said control means clears the received data stored in said storage means;

informing means for informing that said detection means has detected an absence of ink; and instruction means for instructing said control means to read out the image data stored in said storage means.

31. An image processing apparatus according to claim 30, wherein said instruction means comprises input means for performing a predetermined key input and said control means controls said storage means such that the data is read out from said storage means in response to a key input from input means to perform the image recording.

32. An image processing apparatus according to claim 30, wherein said predetermined volume of data is one page of data.

33. An image processing apparatus according to claim 30, wherein said communication means communicates protocol signals and image data with a partner station via a communication line, and wherein said storage means stores data received through said communication means.

34. An image processing apparatus according to claim 30, wherein said ink jet recording device includes a recording head provided with a plurality of ink orifices, each provided with a corresponding ejection energy generating element for generating energy for ejecting ink from the orifice, and an ink storing unit for storing the ink.

35. An image processing apparatus according to claim 34, wherein said recording head and said ink storing unit are integrated.

36. An image processing apparatus according to claim 35, wherein each ejection energy generating element generates thermal energy for ejecting an ink droplet from the corresponding ink orifice by causing a change in state of the ink.

* * * * *

UNITED STATES PATENT AND TRADEMARK OFFICE
CERTIFICATE OF CORRECTION

PATENT NO. : 5,631,674

DATED : May 20, 1997

INVENTOR(S) : YASUYUKI SHINADA ET AL.

It is certified that error appears in the above-identified patent and that said Letters Patent is hereby corrected as shown below:

TITLE PAGE

At [45], after "May 20, 1997" add --*--; Insert --[*] The portion of the term of this patent subsequent to November 26, 2010 has been disclaimed.--.

Signed and Sealed this

Twenty-first Day of October 1997

BRUCE LEHMAN

Attest:

Attesting Officer

Commissioner of Patents and Trademarks